United States Patent
Fujisaki (10) Patent No.: US 7,012,608 B1
(45) Date of Patent: Mar. 14, 2006

(54) SIMULATION DEVICE

(76) Inventor: Iwao Fujisaki, 3-5-8-313, Musashinoshi, Kichijouji Kitamachi, Tokyo 180-0001 (JP)

( * ) Notice: Subject to any disclaimer, the term of this patent is extended or adjusted under 35 U.S.C. 154(b) by 395 days.

(21) Appl. No.: 10/197,990

(22) Filed: Jul. 17, 2002

Related U.S. Application Data (60) Provisional application No. 60/309,304, filed on Aug. 2, 2001.

(51) Int. Cl.
  *G06T 15/00* (2006.01)

(52) U.S. Cl. .................................................. 345/474
(58) Field of Classification Search ............. 345/473, 345/474, 475
  See application file for complete search history.

(56) References Cited

U.S. PATENT DOCUMENTS

| | | | |
|---|---|---|---|
| 5,625,577 A | 4/1997 | Kunii et al. .................. 700/2 |
| 5,687,737 A | 11/1997 | Branham et al. ........... 600/523 |
| 5,990,908 A * | 11/1999 | Thingvold ................... 345/474 |
| 6,011,562 A * | 1/2000 | Gagne et al. ............... 345/473 |
| 6,057,859 A * | 5/2000 | Handelman et al. ....... 345/474 |
| 6,088,034 A | 7/2000 | Deering ...................... 345/420 |
| 6,144,385 A * | 11/2000 | Girard ......................... 345/424 |
| 6,204,860 B1 | 3/2001 | Singh ......................... 345/420 |
| 6,215,500 B1 | 4/2001 | Deering ...................... 345/426 |
| 6,285,380 B1 * | 9/2001 | Perlin et al. ................ 345/473 |
| 6,310,619 B1 | 10/2001 | Rice ........................... 345/420 |
| 6,317,125 B1 | 11/2001 | Ishikawa et al. ........... 345/423 |
| 6,317,130 B1 | 11/2001 | Persson ...................... 345/473 |
| 6,320,988 B1 | 11/2001 | Yamaguchi et al. ........ 382/276 |
| 6,322,448 B1 | 11/2001 | Kaku et al. ................... 463/32 |
| 6,545,682 B1 * | 4/2003 | Ventrella et al. ............ 345/473 |

FOREIGN PATENT DOCUMENTS

| | | |
|---|---|---|
| JP | 2001-005999 A | 12/2001 |
| JP | 2001-006000 A | 12/2001 |

* cited by examiner

*Primary Examiner*—Phu K. Nguyen (57) ABSTRACT

The present invention introduces a simulation device which produces first object on a display means, and said first object is capable of being operated by input means. The present invention also has the following characteristics. First, said first object is composed of body part, first part, second part, third part, and fourth part. Second, said body part and said first part are connected by first joint, said first part and said second part are connected by second joint, said second part and said third part are connected by third joint, and said third part and said fourth part are connected by fourth joint. Third, when said fourth part contacts second object said fourth part maintains horizontal relationship with said second object until said fourth part terminates contact with said second object thereby said simulation device produces a realistic view of human being or similar creature doing certain motions such as, but not limited to, walking, jumping up and down, and/or crouching on the ground.

6 Claims, 8 Drawing Sheets

SIMULATION DEVICE

CROSS REFERENCE TO RELATED APPLICATIONS

This application claims the benefit of U.S. Provisional Application No. 60/309,304, filed Aug. 2, 2001, which is hereby incorporated herein by reference in its entirety.

FIELD OF THE INVENTION

The invention relates to simulation device and more particularly to simulation device which displays or projects human being or a like living creature on monitor or on other similar devices.

BACKGROUND OF THE INVENTION

Figure 1:
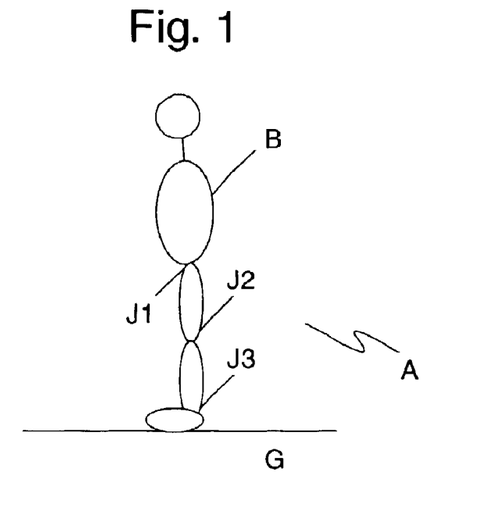
FIG. 1 is a simplified illustration of the prior art of the present invention.
Figures 2, 3:
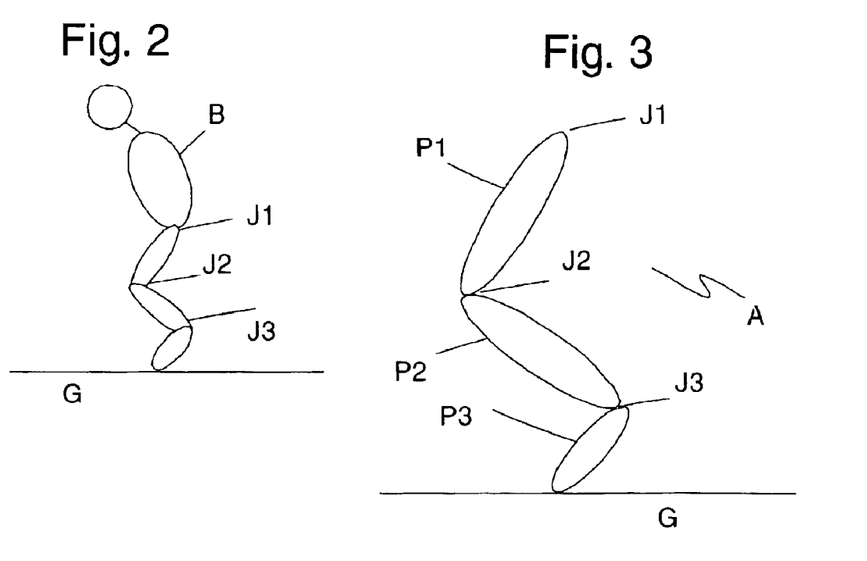
FIG. 2 is a simplified illustration of the prior art of the present invention.
FIG. 3 is a simplified illustration of the prior art of the present invention.

Human beings are frequently displayed on simulation devices, such as video games machine and training devices. These objects are lately more often than not described by way of a particular method so-called "texture mapping." Such method contributes to describe the object on monitor or other similar devices in a more realistic manner so that the user of the simulation device would experience the virtual reality. However, since the manufacturers of these devices did not reproduce the motion of human being in a precise manner, the users had to experience some awkwardness when operating such devices. The users particularly experienced awkwardness when the object on the screen (e.g., human being) is walking, jumping up and down, or crouching on the ground. FIGS. 1 through 3 explain the typical method of describing an object (i.e., a human being) by the prior art. As shown in FIG. 1, primarily the object is composed by body B (which includes head, arm, upper body, and lower body) and one pair of legs A (only one leg A is shown in the figure). Leg A is composed of three parts as shown in the figure, and each part is connected to the other in series by three joints, J1, J2, and J3. FIG. 2 shows how the object is described on the monitor when he/she (assuming that the object is a human being) is about to jump up from ground G. The user will recognize that the object on the monitor is about to jump because the object has started to bend his/her knees, which are joints J2, but can not neglect some sense of awkwardness in his/her motion. FIG. 3 describes the cause of such awkwardness. Leg A (FIG. 1), in prior art, is composed of three parts, P1 which corresponds to thigh in human being, P2 which corresponds to the portion between knee and ankle, and P3 which corresponds to foot. P1 is connected to body B by joint J1, P2 is connected to P1 by joint J2, and P3 is connected to P2 by joint J3. When the object is about to jump up in the air from ground G, P1 rotates clockwise (assuming that the object is facing the left hand side of the figure) on axis J1, P2 rotates anti-clockwise on axis J2, and P3 rotates clockwise on axis J3. As a result, only the tip of P3 which corresponds to a foot of the object contacts ground G which is unlikely to be seen in the real world. When a human being or a like living creature, in the real life, is in a motion to jump in the air and has bent his/her knees, normally his/her toes are firmly contacted to the ground to kick himself/herself therefrom whereas his/her heels are located in the air few inches above the ground. The prior art has neglected such normal behavior of human beings or similar living creatures and resulted in giving an awkward motion to the object on the screen.

U.S. Pat. No. 6,317,125 introduces a video object generation method (100) for converting a model (102) such that a tessellation operation (164) can create a realistic character in real time during game play. According to this prior art, a shelling and slicing operation (106) produces data strings (140) describing a plurality of slices (110) of the model (102). According to this prior art, an assign body parts and edit strings operation (130) places cuts (134) on the model and an apply influences operation (144) establishes the influence on each of a plurality of points (142) from a plurality of bones (148) of a skeleton (146). In real time operations (162) a tessellation operation (164) creates a triangle mesh (165) appropriate to the position and importance of the character in game space, and a properly bent character is displayed in a display operation (168). In this prior art, FIGS. 2, 5, and 7 illustrate the method to display limbs of a human being and/or a like living creature or a part thereof, however, it does not disclose the invention of this application explained hereinafter.

U.S. Pat. No. 6,317,130 introduces an apparatus and method to enable an animation character object, which is pictorially deformed by computer graphics techniques to visually represent human body or animal or the like in the form of a caricature or model, to offer precise and more natural motions at its selected constituent portions that have inherently no joints and no bones by giving thereto joints and skeletons. According to this prior art, face section of a cubic character object is provided with auxiliary skeletons as vertically coupled together. Skeletons are provided which extend from respective endpoints of such auxiliary skeletons and are coupled defining an umbrella shape as a whole. These skeletons are associated with models each consisting of an ensemble of polygons for rendering the character deformable by changing rotation amount of each skeleton. In this prior art, FIGS. 3, 16, 17, 24, and 26 illustrate the method to display limbs of a human being and/or a like living creature or a part thereof, however, it does not disclose the invention of this application explained hereinafter.

U.S. Pat. No. 6,310,619 introduces a method to produce a three-dimensional, virtual reality, tissue specific model of a human or animal body which provides a high level of user-interactivity. According to this prior art, the model functions. can be analyzed and user-modified on a tissue-by-tissue basis, thereby allowing modeling of a wide variety of normal and abnormal tissue attributes and corresponding study thereof. The model can be user-modified through a keyboard, or other VR tools such as a haptic interface. The haptic interface can modify the model to correspond to the tissue attributes of a user, and can provide sensory output corresponding to the interaction of the model to a pre-scripted scene. In this prior art, FIG. 1 illustrates the method to display limbs of a human being and/or a like living creature or a part thereof, however, it does not disclose the invention of this application explained hereinafter.

U.S. Pat. No. 5,625,577 introduces a motion analyzing method analyzes and displays motions of a human being or an animal using a computer in an interactive manner without requiring trial and error or without depending on intuition of an analyst. According to this prior art, a human body or an animal body is divided into a plurality of segments connected by joints, each of the segments acting as a minimal unit of motion. Data for modeling the human or animal body on the basis of physical constraints and the inherent nature of each of the segments is maintained in a database. Motions are input to be analyzed and the input motions are analyzed using inverse dynamics. The resultant movements and the center of gravity of each of the segments, the force and torque exerted on each of the joints, the movement and the center of gravity of the whole body, and the forces and torques exerted on the centers of gravity are superimposed on the human or animal body model of the database and are displayed on a screen. The new motions thus displayed can be used for the teaching of new skills in the industrial or performing arts, in sports, or in animal training. In this prior art, FIGS. 2, 4(i a), 4(i b), 6(i a), 6(i b), 7(i a), 7(i b), 9(i a), 9(i b), 10(i a), 10(i b), 11(i a), and 11(i b) illustrate the method to display limbs of a human being and/or a like living creature or a part thereof, however, it does not disclose the invention of this application explained hereinafter.

U.S. Pat. No. 6,215,500 introduces methods and systems for compressing and decompressing 3-D geometry data which includes regularly tiled surface portions. According to this prior art, one compression method includes representing a surface portion as a "vertex raster", which comprises specifying an extent value and encoding the vertex parameter values of vertices within the surface portion. The extent of the surface portion specifies the arrangement of vertices within the surface portion, and allows the vertices to be properly assembled into drawing primitives during decompression. The encoded vertex parameter values may be encoded globally (by setting initial values and corresponding delta values), locally (on a per-vertex basis), or using a combination of these techniques. Absolute, delta encoding, or delta-delta encoding may be utilized for these parameter values. Vertex parameters which may be encoded in thin manner include position, color, normals, z-displacement values, texture map coordinates, and surface material properties. Additionally, connectivity information may also be encoded using this compression method by specifying quad split bits and half-resolution edges. Quad split bits are used to tessellate a quadrilateral formed by neighboring vertices of a surface portion according to the direction of the strongest color change. Half-resolution edges are utilized to gradually shift from an area of high resolution to an adjacent surface portion represented in lower resolution. For graphical objects which include a plurality of adjacent surface portions, a step command is disclosed which allows data from one surface portion to be advantageously reused. Decompression of a vertex raster representation may comprise decoding the extent value, global parameter values, and a per-vertex stream of local parameter values. In this prior art, FIG. 16 illustrates the method to display limbs of a human being and/or a like living creature or a part thereof, however, it does not disclose the invention of this application explained hereinafter.

U.S. Pat. No. 6,204,860 introduces a system that defines a wire curve deformation primitive with a free-form parametric curve associated with the closest points to the curve on a surface of a model. According to this prior art, the wire curve includes a radius influence defining the points on the object which will be deformed. A scale factor determines the amplitude of the scaling or point movement that is caused by the wire curve. A blending function of the wire curve defines the transition form deformed regions of the object to undeformed regions of the object. The wire curve can have associated with it holder curves defining the domain of deformation about an object caused by one or more wires. A holder curve holds the points of the object in place. Locators are used to define different parameters values along the wire curve. Changes in parameter values around the locators are accomplished by interpolation. Deforming includes preprocessing steps as well as deformation stage operations. In this prior art, FIGS. 1(i a), 1(i b), 11(i c), 11(i d), and 11(i e) illustrate the method to display limbs of a human being and/or a like living creature or a part thereof, however, it does not disclose the invention of this application explained hereinafter.

U.S. Pat. No. 6,144,385 introduces a character animation system executing on a computer. According to this prior art, the system provides a simple, efficient and powerful user interface that allows the user to specify complex animations of multi-legged characters by placing footprints on a surface. A compiler automatically generates a natural looking animation based on the footprints. Motions such as walking, running, jumping, etc. are easily animated depending on the way footprints are placed. The user is able to create new footprint patterns and modify existing patterns. Footprint blocks on a timeline are used to specify the time duration that each foot is in contact with a footprint. The user may specify keyframes in the animation sequence that allow more complicated body movements to be incorporated with the footprint based animation. In this prior art, FIGS. 3, 8, 9, 12, 13, 14, 16, 17, 18, 20, 21, 22, 23, 24, 25, 26, 27, 28, 29, 30, 31, and 32 illustrate the method to display limbs of a human being and/or a like living creature or a part thereof, however, it does not disclose the invention of this application explained hereinafter.

U.S. Pat. No. 6,088,034 introduces a three-dimensional compressed geometry which is decompressed with a unit having an input FIFO receiving compressed data bits and outputting to an input block state machine and an input block, whose outputs are coupled to a barrel shifter unit. According to this prior art, input block output also is input to Huffman tables that output to the state machine. The state machine output also is coupled to a data path controller whose output is coupled to a tag decoder, and to a normal processor receiving output from the barrel shifter unit. The decompressor unit also includes a position/color processor that receives output from the barrel shifter unit. Outputs from the normal processor and position/color processor are multiplexed to a format converter. For instructions in the data stream that generate output to the format converter, the decompression unit generates a tag sent to the tag decoder in parallel with bits for normals that are sent to the format converter. The decompressed stream of triangle data may then be passed to a traditional rendering pipeline, where it can be processed in full floating point accuracy, and thereafter displayed or otherwise used. In this prior art, FIG. 2 illustrates the method to display limbs of a human being and/or a like living creature or a part thereof, however, it does not disclose the invention of this application explained hereinafter.

U.S. Pat. No. 5,687,737 introduces an optimal electrophysiologic mapping system for map-directed arrhythmia surgery and cardiac research allows rapid and accurate interpretation of cardiac activation sequences. In this prior art, the system can display activation or potential distribution data on an anatomically accurate 3-D model of the heart and allows fast, interactive control of viewing characteristics, including control of which cardiac surfaces are displayed, control of virtual lighting, rotational control of the displayed image, etc. The system employs two computer programs, GETPIC3 and MAP3, and runs on a Silicon Graphics workstation capable of rapid graphics calculations and displays. The system utilizes 3-D models of epicardial and endocardial surfaces created with the GETPIC3 program from a sequence of 2-D images of a heart. The individual surfaces are triangulated and may be smoothed using a spline function. The MAP3 program displays activation times either as static isochronous maps or as dynamic time-since-last-activation maps. In the latter case, surface color denotes the time elapsed since a particular area activated. Potential distribution data may also be displayed dynamically. A mouse allows the system operator to control real-time rotation of the model in three dimensions, and any surface can be hidden interactively for better viewing of the data. Control is also provided over the starting, stopping, reversing, and repeating of data, as well as over the frame rate for dynamic displays. In this prior art, FIG. 4 illustrates the method to display limbs of a human being and/or a like living creature or a part thereof, however, it does not disclose the invention of this application explained hereinafter.

U.S. Pat. No. 6,322,448 introduces an image processing device for games which is a device whereby a prescribed number of models (characters) are set up in virtual space, these models are controlled such that they move in prescribed directions in the virtual space, and images of this virtual space from a virtual viewpoint are displayed on means for display. According to this prior art, in order to display the movement of the models that are arranged in virtual space more realistically, in one construction thereof, this device is provided with means for image processing that apply virtual centripetal force to the models. Furthermore, in order to display the movement of the models more realistically and to heighten the dramatic effect, in one construction thereof, this device is equipped with means for processing residual image presentation in order to represent the track of movement of a model as residual images. This means for processing is equipped with means for storage that store without modification motion data of the model prior to the current motion and with means for display control that display this stored data together with the current motion data. In this prior art, FIGS. 3, 5, 16, 17, 18, 23, 35, 49, 60, 61, 62, 63, 64, 65, and 67 illustrate the method to display limbs of a human being and/or a like living creature or a part thereof, however, it does not disclose the invention of this application explained hereinafter.

U.S. Pat. No. 6,320,988 introduces a method of transforming the shape of a skeleton model, wherein this method can easily handle a skeleton model of a multiple-branching structure and enables the easy setting of complicated restrictive conditions. According to this prior art, node coordinates and arc-normal vectors are used as basic variables. Basic equations, which comprise an equation defining the length of an arc and which use basic variables as unknowns, and an evaluation expression for uniquely specifying a solution that satisfies these basic equations are modified, based on data such as mouse input. A solution for the basic variables that satisfies the basic equations and minimizes the value of the evaluation expression is obtained, and the shape of the skeleton model is transformed accordingly. The evaluation expression is used to set minimization of the sum-of-squares of arc-to-arc angles, rubber-banding, dampers, and inertia. The basic equations and the evaluation expression are updated in synchronization with the end of a loop. A spring restriction can be set, and the use of a restrictive condition in the next loop of the calculations can be determined from whether or not the restrictive condition was used in the previous loop, and whether or not an object has passed a boundary. In this prior art, FIGS. 4, 5A, 5B, 5C, 5D, 5E, 6, 8A, 8B, 9A, 9B, 10, 11, 22A, and 23A illustrate the method to display limbs of a human being and/or a like living creature or a part thereof, however, it does not disclose the invention of this application explained hereinafter.

JP2001005999 introduces an image generation system capable of realizing natural motion representation which is realistic and has a high variety degree with a small data quantity, and to obtain an information storage medium. According to this prior art, when the forearm 14 of an enemy character is hit, the arm 14 is made to move by physical simulation by a hit power vector FHO, hit power vectors FH1 to FH4 whose magnitudes are attenuated also are successively transmitted to the upper arm 16 being a parent part, the chest 18 and the waist 20, these parts are moved by the FH1 to FH4 to generate the motions of the objects. Turning resistance power corresponding to an angular velocity and restoring force returning to a default posture are applied to each part. When the hit is made, motion reproduction on the basis of motion data is switched over to motion generation by physical simulation, and when a given time passes and when a bodily power parameter becomes zero, the motion generation is switched over to the motion reproduction. When switching is performed, connection motion is reproduced or generated. In this prior art, FIGS. 3, 4, 8, and 11 illustrate the method to display limbs of a human being and/or a like living creature or a part thereof, however, it does not disclose the invention of this application explained hereinafter.

JP2001006000 introduces an image generation system capable of realizing more realistic motion representation with a small data quantity and an information storage medium. According to this prior art, the motion of an enemy character is generated so that the right leg 52 that does touch the ground can be moved to a motion target position 54 limiting the enemy character not to fall at the same time when the enemy character moves so as to fall with left leg SO touching the ground as a support. The enemy character is made to perform falling movement by applying force obtained by applying virtual weight to a virtual center of gravity of the enemy character to the waist 60. A movement target position 54 is set to the position being point symmetrical to the left leg with regard to the projected position of the virtual center of gravity to the ground surface. When both the legs touch the ground, the leg being closer to the waist is made to lift in the air. When a part of the enemy character is hit, its forearm is made to move by physical simulation, and a hit power vector also is successively transmitted to move its parent part. When a hit is made, when a given time is passes or when a bodily power parameter becomes zero, switching is performed between motion generation and motion reproduction. In this prior art, FIGS. 3, 4, 8, 11, 12, 14, 15, 18, and 19 illustrate the method to display limbs of a human being and/or a like living creature or a part thereof, however, it does not disclose the invention of this application explained hereinafter.

SUMMARY OF THE INVENTION

It is an object of the present invention to provide a simulation device to perfect the virtual reality technology.

It is another object of the invention to provide a simulation device to reproduce natural behavior of human beings, similar living creatures (such as monkeys, chimpanzees, and gorillas), human-like robots, or any other creatures which have toes or similar body parts on the screen.

In order to achieve such objectives, the present invention introduces a simulation device which produces first object on a display means, and said first object is capable of being operated by input means. The present invention also has the following characteristics.

First, said first object is composed of body part, first part, second part, third part, and fourth part.

Second, said body part and said first part are connected by first joint, said first part and said second part are connected by second joint, said second part and said third part are connected by third joint, and said third part and said fourth part are connected by fourth joint.

Third, when said fourth part contacts second object, said fourth part maintains horizontal relationship with said second object until said fourth part terminates contact with said second object, thereby, said simulation device produces a realistic view of a human being or a similar creature doing certain motions such as, but not limited to, walking, jumping up and down, and/or crouching on the ground.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 4:
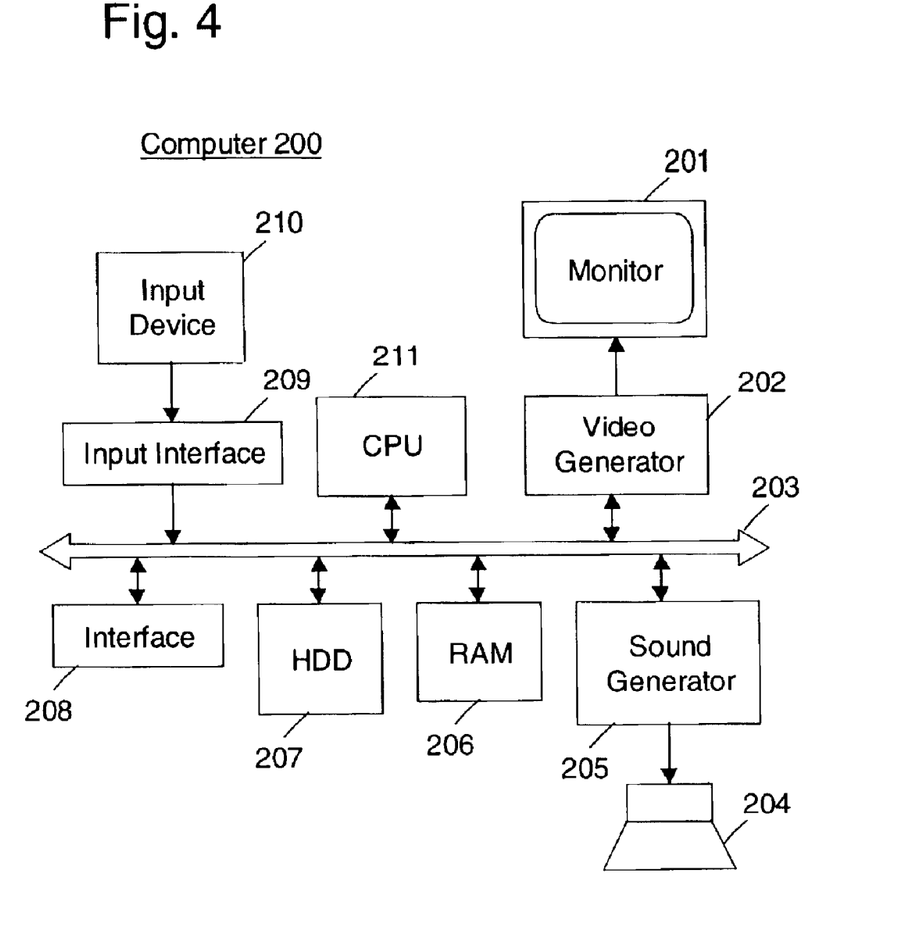
FIG. 4 is a block diagram illustrating an exemplary embodiment of the present invention.

FIG. 4 illustrates the details of computer 200 which performs the present invention. CPU 211 controls and administers the overall function and operation of computer 200. CPU 211 uses RAM 206 to temporarily store data and/or to perform calculation to perform its function. Video generator 202 generates analog and/or digital video signals which are displayed on monitor 201. Sound generator 205 generates analog and/or digital video signals that are transferred to speaker 204. HDD 207 stores data and/or programs which are necessary to perform the present invention. Interface 208 is an interface between computer 200 and a server. Input signals are input by input device 210, such as keyboard and joystick, and the signals are transferred via input interface 209 and data bus 203 to CPU 211. Computer 200 can have the same or a similar structure to the computers which are described in FIG. 1 of the U.S. Pat. No. 5,870.101, FIG. 2 of the U.S. Pat. No. 6,157,384, FIG. 1 of the U.S. Pat. No. 5,774,125, FIG. 1 of the U.S. Pat. No. 5,375,206, and/or FIG. 1 of the U.S. Pat. No. 5,925,127. Overall, computer 200 has the capability of displaying three-dimensional objects on monitor 201 by utilizing the texture mapping method or only by polygons.

FIGS. 5 through 14 explain the exemplary method to describe an object on monitor 201 (FIG. 4).

Figure 5:
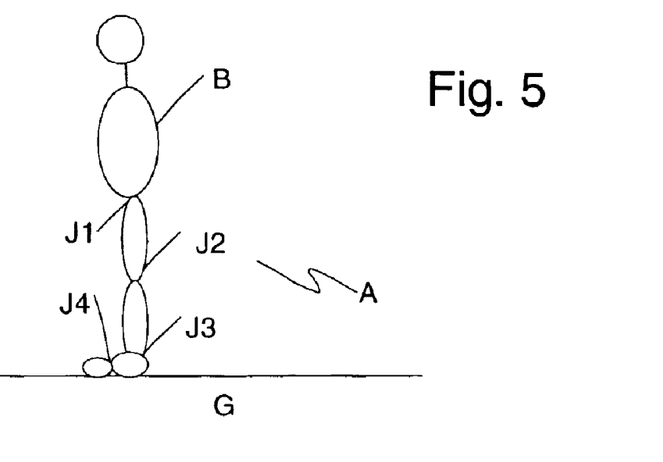
FIG. 5 is a simplified illustration of an exemplary embodiment of the present invention describing each part of an object and the movement thereof.

As shown in FIG. 5, primarily the object is composed by body B (which includes head, arm, upper body, and lower body), and one pair of legs A (only one leg A is shown in the figure). Leg A is composed of four parts as shown in the figure, and each part is connected to the other in series by four joints, J1, J2, J3, and J4. FIG. 5 illustrates an object (e.g., human being) standing on ground G.

Figure 6:
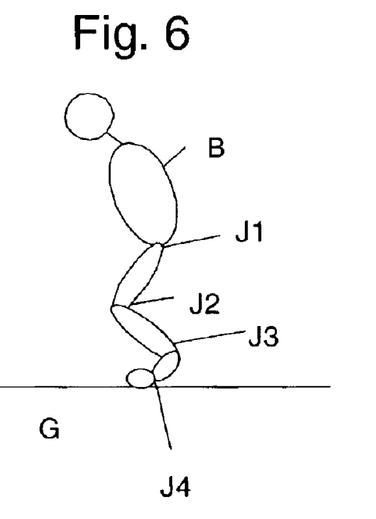
FIG. 6 is a simplified illustration of an exemplary embodiment of the present invention describing each part of an object and the movement thereof.

FIG. 6 shows how the object is described on monitor 201 (FIG. 4) when he/she is about to jump up from ground G. By way of calculation rendered by CPU 211 (FIG. 4), the object bends his/her knees, which are joints J2, as well as J1, and his ankles, which are J3, and in addition, J4.

Figure 7:
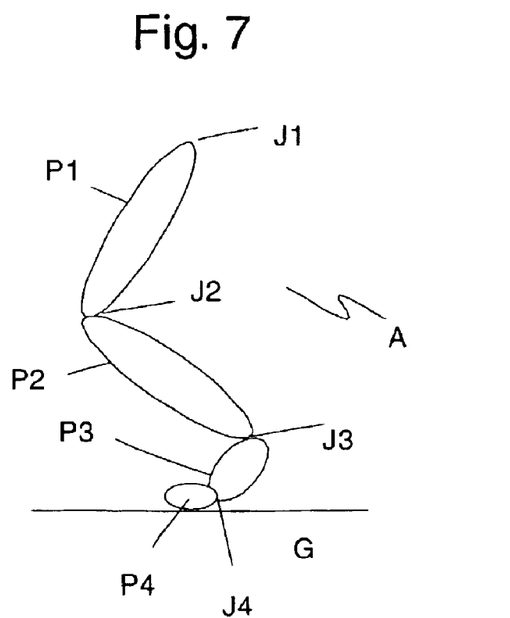
FIG. 7 is a simplified illustration of an exemplary embodiment of the present invention describing each part of an object and the movement thereof.

FIG. 7 describes the motion in details. In FIG. 7, Leg A is composed of four parts, P1 which corresponds to thigh in human being, P2 which corresponds to the portion between knee and ankle, P3 which corresponds to foot, and P4 which corresponds to toe in human being. P1 is connected to body B by joint J1, P2 is connected to P1 by joint J2, P3 is connected to P2 by joint J3, and P4 is connected to P3 by J4. When the object is about to jump up in the air from ground G, P1 rotates clockwise (assuming that the object is facing left side of the figure) on axis J1, P2 rotates anti-clockwise on axis J2, P3 rotates clockwise on axis J3, and P4 remains its position, i.e., a horizontal relationship with the surface of ground G.

Figure 8:
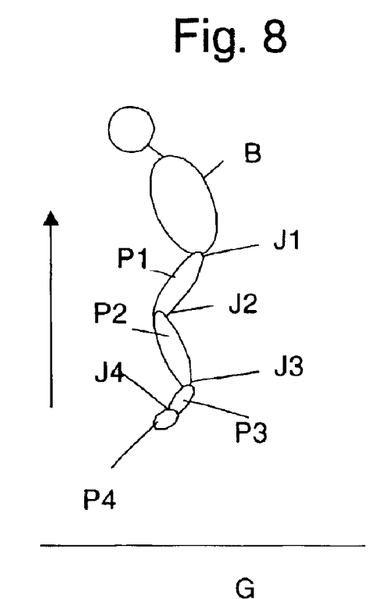
FIG. 8 is a simplified illustration of an exemplary embodiment of the present invention describing each part of an object and the movement thereof.

When the object has completed his/her motion, as described in FIG. 8, and is in the air and no longer has contact with ground G, P1 has rotated anti-clockwise on axis J1, P2 has rotated clockwise on axis J2, P3 has rotated anti-clockwise on axis J3, and P4 has rotated anti-clockwise on axis J4.

Figure 9:
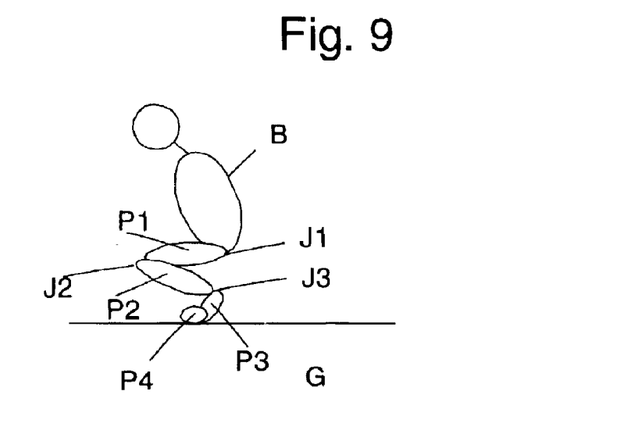
FIG. 9 is a simplified illustration of an exemplary embodiment of the present invention describing each part of an object and the movement thereof.

FIG. 9 is an illustration of an object when he/she has just landed on ground G. Here, P1 has rotated clockwise on axis J1, P2 has rotated anti-clockwise on axis J2, P3 has rotated clockwise on axis J3, and P4 has rotated on axis J4. Since the object is on ground G, CPU 211 (FIG. 4) calculates the angle of J4 in such a way to display P4 to be in horizontal relationship with the surface of ground G.

Figure 10:
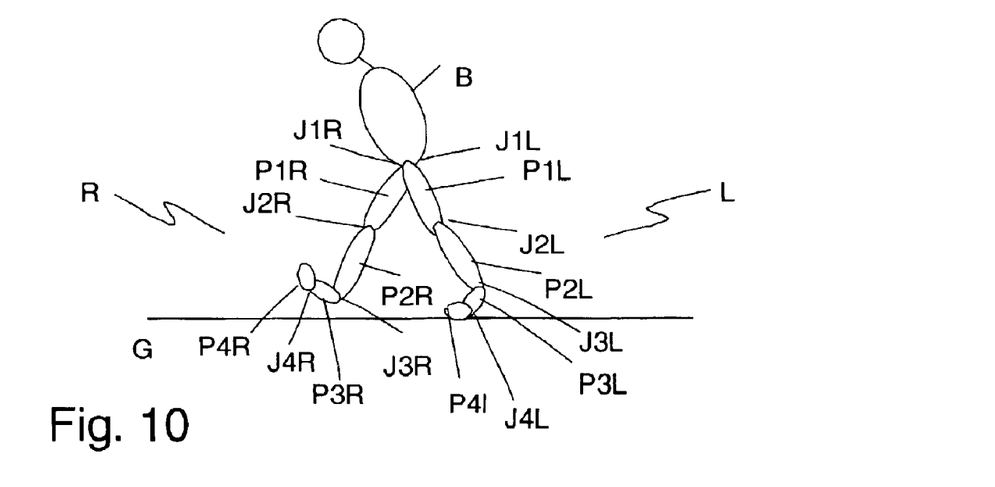
FIG. 10 is a simplified illustration of an exemplary embodiment of the present invention describing each part of an object and the movement thereof.

FIG. 10 is an illustration of an object when he/she is in a walking motion. FIG. 10 shows a moment when the object is about to step out his/her right leg where the left leg is pushing the ground to move forward. Here, CPU 211 (FIG.

4) calculates the position of the two legs of the object, leg R and leg L. Leg R is composed of four parts, P1R, P2R, P3R, and P4R. P1R is connected to body B by joint J1R, P2R is connected to P1R by joint J2R, P3R is connected to P2R by joint J3R, and P4R is connected to P3R by joint J4R. Similarly, Leg L is composed of four parts, P1L, P2L, P3L, and P4L. P1L is connected to body B by joint J1L, P2L is connected to P1L by joint J2L, P3L is connected to P2L by joint J3L, and P4L is connected to P3L by joint J4L. When the object is in a walking motion, with regard to leg R, his/her P1R rotates clockwise on axis J1R, P2R rotates clockwise on axis J2R, P3R rotates clockwise on axis J3R, and P4R also rotates clockwise on axis J4R. With regard to leg L, his/her P1L rotates anti-clockwise on axis J1L, P2L rotates anti-clockwise on axis J2L, P3L rotates anti-clockwise on axis J3L, and P4L remains its position of a horizontal relationship with the surface of ground G until its contact with ground G is totally terminated.

Figure 11:
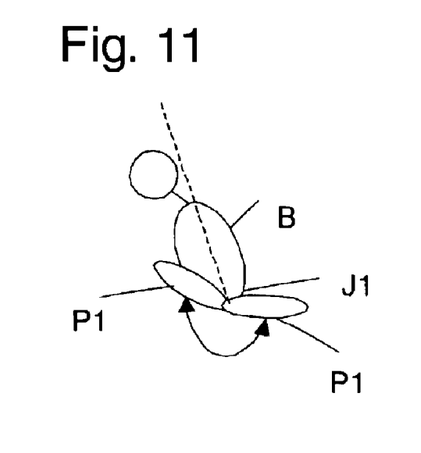
FIG. 11 is a simplified illustration of an exemplary embodiment of the present invention describing each part of an object and the movement thereof.
Figure 12:
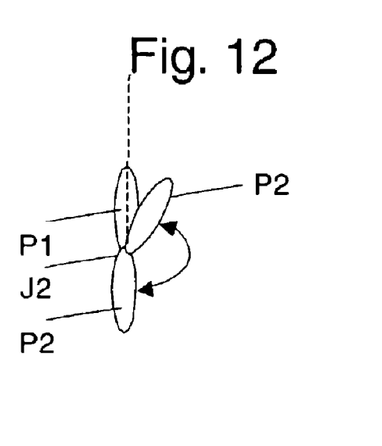
FIG. 12 is a simplified illustration of an exemplary embodiment of the present invention describing each part of an object and the movement thereof.
Figure 13:
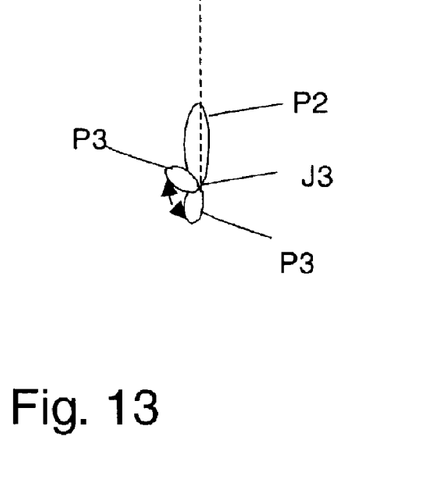
FIG. 13 is a simplified illustration of each part of an object and the movement thereof.
Figure 14:
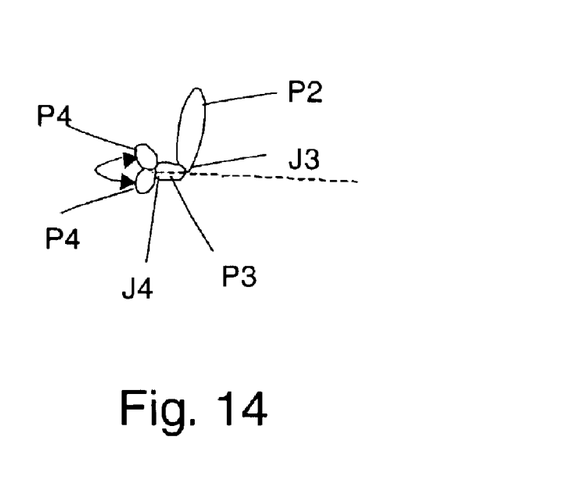
FIG. 14 is a simplified illustration of an exemplary embodiment of the present invention describing each part of an object and the movement thereof.

FIGS. 11 through 14 illustrate the maximum rotation capacity of each part, i.e., P1, P2, P3, and P4. FIG. 11 illustrates that P1 rotates on axis J1 in the range of 25 degrees and 280 degrees anti-clockwise from body B. FIG. 12 illustrates that P2 rotates on axis J2 in the range of 180 degrees and 355 degrees anti-clockwise from P1. FIG. 13 illustrates that P3 rotates on axis J3 in the range of 40 degrees and 175 degrees anti-clockwise from P2. FIG. 14 illustrates that P4 rotates on axis J4 in the range of 120 degrees and 240 degrees anti-clockwise from P3. Dashed line is provided to each figure for the convenience of the readers of this specification to understand where the measurement of each angle starts from.

Figure 15:
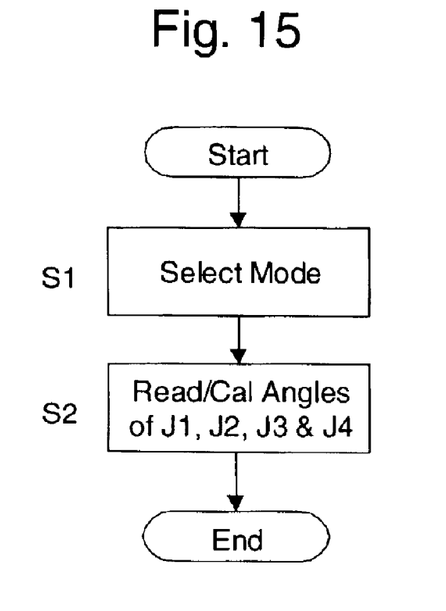
FIG. 15 is a flowchart illustrating an exemplary embodiment of the present invention.
Figure 16:
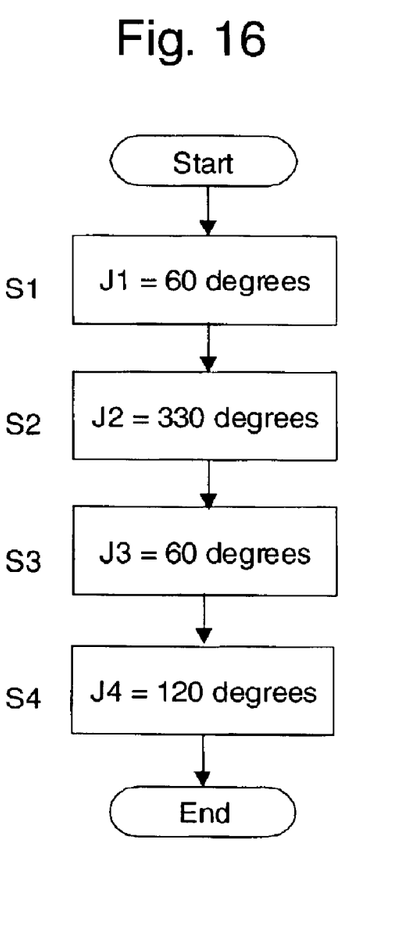
FIG. 16 is a flowchart illustrating an exemplary embodiment of the present invention.
Figure 17:
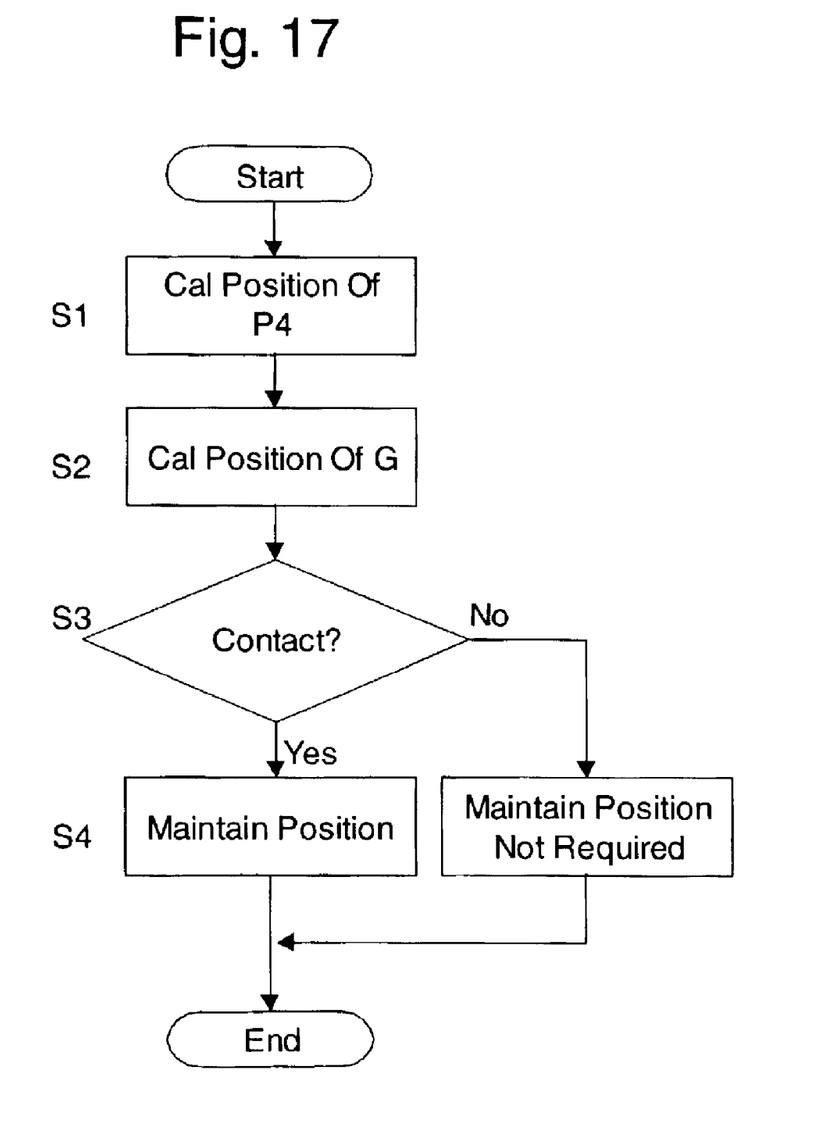
FIG. 17 is a flowchart illustrating an exemplary embodiment of the present invention.

FIGS. 15 through 17 illustrate the method of determining the angles of J1, J2, J3 and J4. As illustrated in FIG. 15, first of all, CPU 211 (FIG. 4) selects the mode by which the angles are determined (Step 1). Typical modes include standing mode, sitting mode, running mode, kicking mode, and crouching mode. Once the mode is selected, the relevant angle data are read from HDD 207 as described in FIG. 18 hereinafter or calculated by CPU 211 by using RAM 206 (Step 2). For example, if CPU 211 (FIG. 4) selects the crouching mode, the value of each angle will be J1=80 degrees (Step 1), J2=330 degrees (Step 2), J3=80 degrees (Step 3), and J4=120 degrees (Step 4) as described in FIG. 16, and the object who is crouching on ground G in a similar posture described in FIG. 9 will be displayed on monitor 201 (FIG. 4). As another embodiment of the present invention, the angle of J4 (FIG. 14) can be calculated real time as illustrated in FIG. 17. First, CPU 211 (FIG. 4) calculates the position (x, y, z) of P4 (Step 1). Next, CPU 211 (FIG. 4) calculates the position (x, y, z) of the surface of Ground G (Step 2). If CPU 211 determines that P4 is contacting the surface of ground G (Step 3), J4 is calculated in such a way that P4 maintains its horizontal relationship with the surface of ground G as illustrated in P4 of FIG. 9 (Step 4). On the other hand, if P4 is not contacting the surface of ground G, P4 is no longer required to maintain horizontal relationship with the surface of ground G (Step 4).

Figure 18:
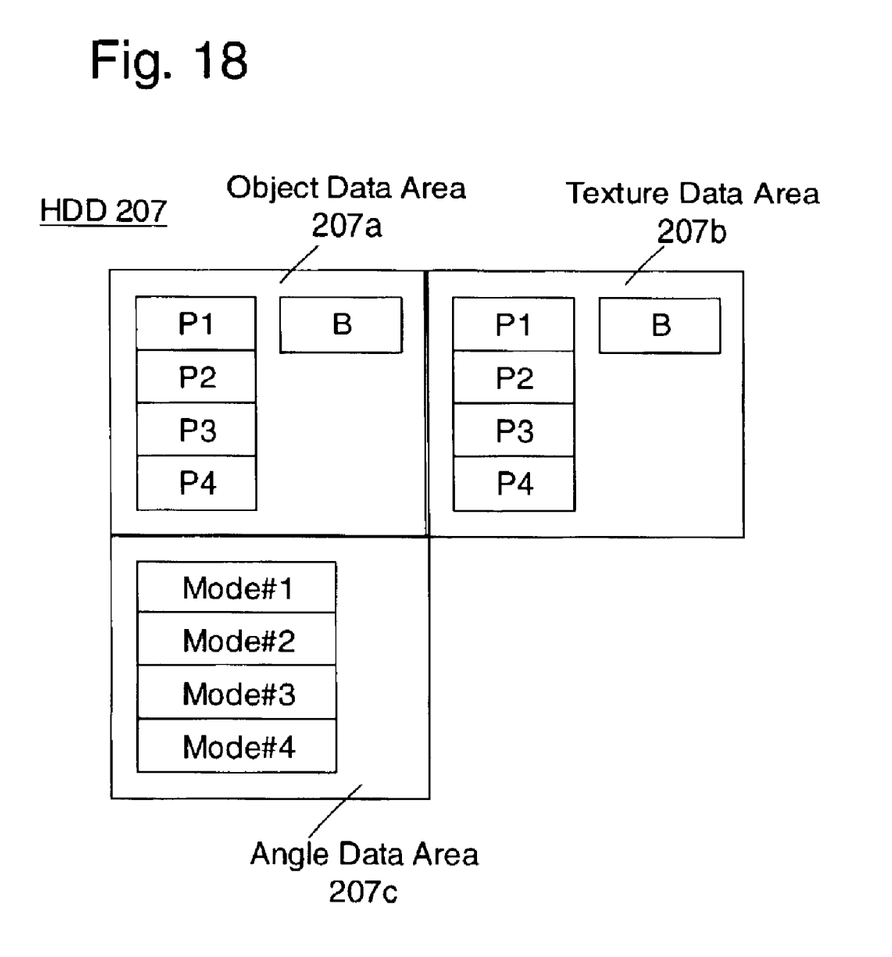
FIG. 18 is a block diagram illustrating an exemplary embodiment of the present invention.

FIG. 18 illustrates the types of data which are stored in HDD 207 (FIG. 4). HDD 207 includes three areas: Object Data Area 207a, Texture Data Area 207b, and Angle Data Area 207c. Object Data Area 207a stores the three dimensional data of each part of the object (human being) including body B, P1, P2, P3, and P4. Texture Data Area 207b stores the texture data which are to be "pasted" on surface of body B, P1, P2, P3, and P4. Angle Data Area 207c stores the angle data of each joint (J1, J2, J3, and J4) of each mode. For example, Mode#1 stands for the standing mode and the relevant angle data are: J1=180, J2=180, J3=90, and J4=180. Mode#2 stands for the sitting mode and the relevant angle data are: J1=90, J2=270, J3=90, and J4=180. Mode#3 stands for the crouching mode and the relevant angle data are: J1=80, J2=330, J3=60, and J4=120.

It is essential to understand that the present invention is not limited in displaying human beings on the screen, but also applicable in displaying similar living creatures (such as monkey, chimpanzee, or gorilla) or human-like robots or any other creatures which have toes or similar body parts.

As another embodiment of the present invention, P3 and P4 can be combined with fixed angle and treated as one part, P34. Thereby the shape of P34 is similar to that of boomerang. HDD 207 contains several numbers of P34 which have different interior angles such as 120, 130, 140, 150, 160, and 170.

Having thus described a presently preferred embodiment of the present invention, it will not be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

I claim:

1. A computer generated toe displaying software which displays an object and a computer generated surface on a display means of a computer, wherein said object comprises a body portion an upper leg portion, a lower leg portion, a foot portion, and a toe portion said foot portion and said toe portion are connected by a foot and toe portion connecting joint, when said toe portion is in horizontal relationship with said computer generated surface, said toe portion refrains from rotating while said foot portion is enabled to rotate clockwise or anti-clockwise.

2. The computer generated toe displaying software of claim 1, wherein said toe portion is displayed on said display means by utilizing a texture mapping method.

3. The computer generated toe displaying software of claim 1, wherein said toe portion and said foot portion are composed of a single image data, a plurality of said single image data of different interior angles are displayed thereby enabling to display the rotation of said toe portion.

4. A computer generated toe displaying software which displays an object and a computer generated surface on a display means of a computer wherein said object comprises a body portion, an upper leg portion, a lower leg portion, a foot portion, and a toe portion, said foot portion and said toe portion are connected by a foot and toe portion connecting joint, said object is capable to be in a toe and foot non-rotating motion, a toe non-rotating motion, and a toe and foot rotating motion, when said object is in said toe and foot non-rotating motion, said toe portion maintains horizontal relationship with said computer generated surface and both said toe portion and said foot portion refrain from rotating, when said object is in said toe non-rotating motion, said toe portion still maintains horizontal relationship with said computer generated surface and refrains from rotating while said foot portion is enabled to rotate, and when said object is in said toe and foot rotating motion, said toe portion ceases to maintain horizontal relationship with said computer generated surface and both said toe portion and said foot portion are enabled to rotate.

5. The computer generated toe displaying software of claim 4, wherein said toe portion is displayed on said display means by utilizing a texture mapping method.

6. The computer generated toe displaying software of claim 4, wherein said toe portion and said foot portion are composed of a single image data, a plurality of said single image data of different interior angles are displayed thereby enabling to display the rotation of said toe portion.

* * * * *